2,951,818

ION EXCHANGER MEMBRANES FROM POLY-VINYLIDENE CHLORIDE AND PHENOLIC RESIN REACTANTS

Karl Haagen, Leverkusen-Bayerwerk, Germany, assignor to Farbenfabriken Bayer Aktiengesellschaft, Leverkusen, Germany, a corporation of Germany No Drawing. Filed Feb. 14, 1956, Ser. No. 565,299

Claims priority, application Germany Feb. 10, 1955

5 Claims. (Cl. 260—2.1)

In order to improve the stability of ion exchanger membranes, these frequently have embedded therein plastics in the form of fibres, fabrics, meshes, screens and foils (see for example patent application Serial No. 488,411). For this purpose, only such plastics are used as are stable under the manufacturing conditions of the exchanger resins. These are, however, to a large extent hydrophobic and have chemical and physical properties which are quite different from those of the hydrophilic ion exchanger resins, so that a firm bonding between the plastic fibres and the exchanger substance is not produced. For this reason, the stability of such exchanger membranes is in many cases inadequate.

For example, if a thread of polyvinylidene chloride is incorporated into an exchanger membrane by introducing said thread into the liquid reaction mixture used as starting material and thereafter condensing said mixture to the solid exchanger membrane the said threads can be extracted longitudinally from the membrane after swelling it in water without the membrane being damaged. If the thread is extracted transversely, that is to say, by perforating the membrane layer disposed above it, the hydrogel of the ion exchanger is completely broken away from the smooth surface of the thread.

If a membrane is made which has a thickness substantially corresponding to that of an embedded plastic lattice, so that it is substantially only the interstices of the lattice which are filled by the ion exchanger, it is found that the exchanger filling the lattice gradually crumbles away, particularly when there are changes in swelling. If it is desired to avoid this, the membrane must be made thicker and the carrier frame must be completely embedded in the exchanger membrane, but this has the result of increasing the electrical resistance.

It has now been found that these disadvantages can be avoided if the plastics used as frame substances for exchanger membranes are those which have reactive atoms or atom groups, and if these are condensed on the surface with compounds which are such that they are in turn bonded on the ion exchanger resin when the membrane is made.

If it is desired, for example to use a polyvinylidene chloride fabric as support for an anion exchanger membrane which is obtained by condensing an amine with formaldehyde, the surface of the fabric is initially condensed with an amine, whereupon the fabric thus initially treated is reacted with the same or a different condensable amine with addition of $CH_2O$ to the exchanger membrane. In this manner, a chemical bonding of the ion exchanger to the frame substance is obtained, which would not occur without initial condensation of the fibre with the amine. A polyvinylidene chloride thread or wire initially treated in the same way cannot be withdrawn from the membrane after being incorporated therein by condensation without the frame of the membrane being simultaneously destroyed.

Suitable amines for carrying this process into effect are, for example aromatic monoamines, such as aniline, substituted anilines, which contain a hydrogen atom bonded to the nitrogen and which are able to condense with formaldehyde, such as monoalkylanilines (e.g. N-methylaniline) toluidine, anisidine, furthermore aromatic polyamines and aliphatic polyamines which contain reactive hydrogen atoms, such as phenylenediamines, benzidines, ethylenediamine, diethylenetriamine, triethylenetetramine.

Other compounds which may be reacted with the frame substances are monohydroxybenzenes and polyhydroxybenzenes in which the hydrogen of a phenol group is replaced by alkaline metals and which can still be condensed with $CH_2O$.

These pretreated frame substances may also be used for the production of cation exchanger membranes, which are obtained by condensing formaldehyde with aromatic compounds which contain cation-exchanging groups. Such cation exchanging resins are well known in the art and are for instance disclosed in United States Patents 2,104,501, 2,191,853, 2,636,851, 2,702,272, and British Patent 613,139.

In this connection special reference is made to the copending application Serial No. 488,411, filed on February 2, 1955, in the name of Karl Haagen and Friedrich Helfferich.

For the initial treatment of the frame substance, it is generally sufficient to heat the latter for a few hours at 90–100° with the aqueous alkaline solution or dispersion of the suitable organic compound and to dry it at the same temperature after draining off the solution. This treatment generally results in the fibres becoming dark in color. Under appropriate reaction conditions, the reaction of the fibre substance with the amine can take place to such a degree that the strength of the fibres is impaired.

Instead of polyvinylchloride there may be used other plastics which contain exchangeable halogen atoms, such as polytrifluorochloroethylene, furthermore polyvinylchloride.

Example 1

A screen made of a polyvinylidene chloride thread is heated at 95–100° for about 5 hours in an aqueous solution which contains 15% of phenol and 4% of NaOH. The solution is then drained off and the lattice dried. The fibre, which has assumed a brownish color, is now used for the production of an ion exchanger membrane, which is obtained in the following manner:

223 g. of moist, 81.8% phenoxyacetic acid are introduced into the solution of 100 g. of 100% sulphuric acid in 40 ml. of water and dissolved by heating to 95–100°. 225 g. of moist, 2.4-sodium benzaldehyde disulphonate (purity 59% based on the molecular weight 266), are thereafter introduced at the same temperature and while stirring. The temperature is now raised to 105–110° and kept at this temperature until the benzaldehyde disulphonic acid is consumed. The condensation product is obtained as a clear, viscous and deep cherry-red solution. It is allowed to cool slightly and then 215 g. of 40% formalin solution and 520 g. of 81.8 phenoxyacetic acid are added, the mixture then being heated to about 80°. The temperature continues to rise to 106° without heating, boiling under reflux taking place. After the temperature has dropped to about 100°, 90 g. of para-formaldehyde are added in one portion. The temperature is now maintained at 95° until a viscous solution has formed. This solution is poured on to a sheet of glass on which the aforementioned membrane is laid and heated to 90° in a chamber after being covered with a second sheet. A reddish clear membrane is obtained which contains the sulpho and carboxyl groups in the ratio of 1:4. With the transformation of the hydrogen form of the exchanger into sodium form, the swelling of the membrane is considerably increased.

By this means however, its strength properties are simultaneously impaired. If it is desired to use the membrane in the sodium form, the procedure adopted is that according to French Patent 1,071,917 and the exchanger molecule has incorporated therein by condensation a compound which does not contain any exchange-active atom group but which is polyfunctional as regards its reactivity relatively to aldehydes.

In the present example, 200 g. of diphenyl ether or naphthalene were added with the supply of 215 g. of formalin solution and 520 g. of phenoxyacetic acid and the amount of paraformaldehyde raised to 220 g. If the procedure in other respects is as indicated above, an exchanger membrane is obtained which is also stable in the sodium form.

*Example 2*

A fabric consisting of polyvinylidene chloride is heated for several hours at 95° in a saturated aqueous aniline solution which contains undissolved aniline and dried after allowing the solution to drain off. The fabric has become blackish-brown in color and is used in the conventional manner as a supporting fabric for an ion exchanger membrane which is obtained as follows:

650 g. of phenoxyethyl-trimethyl-ammonium chloride $C_6H_5OCH_2CH_2$—$N(CH_3)_3Cl$, obtained by reacting phenoxyethyl chloride with trimethylamine, are heated to 60–70° and while stirring with 255 g. of diphenyl ether, 350 g. of paraformaldehyde and 730 g. of 70% sulphuric acid. The temperature rises to 109° without any further heat being supplied and the mixture is kept for about 15 minutes at this temperature, boiling under reflux taking place. The viscous condensation product thus obtained is cast on to glass sheets. The aforementioned fabric is then placed thereon and forced into the solution. Heating is carried out for about 18 hours at 90° and a light, slightly cloudy anion exchanger membrane is obtained which contains quaternary nitrogen atoms fixed therein.

Instead of using aniline, it is also possible to use the reaction product of phenoxyethyl chloride with polyethylene polyamine, which product reacts with $CH_2O$ both at the still unsubstituted hydrogen of the amine and at reactive nuclear hydrogen atoms of the phenoxy group and is able to form bridges with the ion exchanger molecules.

Substances which are used as bonding elements and which, after bonding with the fibre, still contain free phenolic OH groups or substitutable H atoms on nitrogen atoms can of course also be used for membranes in which epichlorhydrin functions as cross-linking agent.

*Example 3*

A polyvinylidene fabric is heated for 18 hours at 97° in a solution of 40 g. of 50% polyethylene imine in 100 cc. of water. The solution, in which it is possible to detect Cl, is decanted and the fabric is dried at 110° C. The further processing is carried out as in Example 2.

*Example 4*

A polyvinylidene fabric is heated in a melt of 22 g. of resorcin and 8 g. of 50% caustic soda solution for 20 hours in a boiling water bath and is then washed with water and dried. The fabric has acquired an olive shade. The further processing is carried out as in Example 1.

*Example 5*

A polyvinylidene fabric is reacted with resorcin as disclosed in Example 4. Thereafter this fabric is imbedded between glass plates in the same manner as disclosed in Example 1 in a viscous reaction mixture obtained by heating to 95° C. 84 parts by weight of sulfonated diphenylether, 40 parts by weight of formaldehyde 40%, and 10 parts by weight of paraformaldehyde. (The sulfonated diphenylether is obtained by heating 55 parts by weight of diphenylether with 20 parts by weight of $H_2SO_4$ 100% and 10 parts by weight of oleum (60% $SO_3$) during one hour until a temperature of 180° is reached and thereafter keeping said temperature for one hour.) After heating the reaction mixture within the glass plates for 18 hours at 90° C. there are obtained clear membranes of reddish color which contain only strong ion exchanging groups.

What I claim is:

1. A product obtained by treating a screen of polyvinylidene chloride thread at an elevated temperature with an aqueous alkaline solution of phenol for about 5 hours; subsequently pouring on said treated screen a viscous product obtained by condensing phenoxyacetic acid, 2,4-sodium benzaldehyde disulphonate and para-formaldehyde; then covering and heating said treated screen and condensation product until a reddish, clear membrane is obtained.

2. A product obtained by treating a fabric of polyvinylidene chloride at an elevated temperature with a saturated aqueous aniline solution which contains undissolved aniline until the fabric becomes blackish-brown; subsequently forcing said treated fabric into a viscous product obtained by condensing phenoxyethyl-trimethyl-ammonium chloride, diphenyl ether, and para-formaldehyde in the presence of 70% sulfuric acid; and heating said treated fabric and condensation product for about 18 hours at 90° C.

3. A product obtained by treating a polyvinylidene fabric at an elevated temperature with a 50% aqueous solution of polyethylene imine for about 18 hours; subsequently forcing said treated fabric into a viscous product obtained by condensing phenoxyethyl-trimethyl-ammonium chloride, diphenyl ether, and para-formaldehyde in the presence of 70% sulfuric acid; and heating said treated fabric and condensation product for about 18 hours at 90° C.

4. A product obtained by treating a polyvinylidene fabric on a boiling water bath with a melt of resorcin and 50% caustic soda solution until the fabric becomes an olive shade; subsequently pouring on said treated fabric a viscous product obtained by condensing phenoxyacetic acid, 2,4-sodium benzaldehyde disulphonate and para-formaldehyde; then covering and heating said treated fabric and condensation product until a reddish, clear membrane is obtained.

5. A product obtained by treating a polyvinylidene fabric on a boiling water bath with a melt of resorcin and 50% caustic soda solution until the fabric becomes an olive shade; subsequently imbedding said treated fabric between glass plates in a viscous reaction mixture obtained by condensing sulfonated diphenylether, formaldehyde, and para-formaldehyde; and heating said fabric and condensation product until a clear, reddish membrane is obtained.

References Cited in the file of this patent

UNITED STATES PATENTS

| | | |
|---|---|---|
| 2,421,852 | Rogers | June 10, 1947 |
| 2,438,097 | Rogers | Mar. 16, 1948 |
| 2,454,209 | Rogers | Nov. 16, 1948 |
| 2,466,998 | Rogers | Apr. 12, 1949 |
| 2,636,851 | Juda et al. | Apr. 28, 1953 |
| 2,731,425 | Juda et al. | Jan. 17, 1956 |
| 2,798,850 | Voigtman et al. | July 9, 1957 |